(12) United States Patent
Reimchen

(10) Patent No.: US 11,002,321 B2
(45) Date of Patent: May 11, 2021

(54) RETURN STOP AND TRANSFER CASE COMPRISING A RETURN STOP

(71) Applicant: Schaeffler Technologies AG & Co. KG, Herzogenaurach (DE)

(72) Inventor: Alexander Reimchen, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/493,355

(22) PCT Filed: Feb. 26, 2018

(86) PCT No.: PCT/DE2018/100169
§ 371 (c)(1),
(2) Date: Sep. 12, 2019

(87) PCT Pub. No.: WO2018/184623
PCT Pub. Date: Oct. 11, 2018

(65) Prior Publication Data
US 2020/0032861 A1 Jan. 30, 2020

(30) Foreign Application Priority Data
Apr. 3, 2017 (DE) ...................... 10 2017 107 102.4

(51) Int. Cl.
*F16D 41/067* (2006.01)
*F16D 23/12* (2006.01)
(Continued)

(52) U.S. Cl.
CPC ............ *F16D 41/067* (2013.01); *B60K 17/02* (2013.01); *F16D 23/12* (2013.01); *F16D 28/00* (2013.01);
(Continued)

(58) Field of Classification Search
CPC ........ F16D 41/067; F16D 23/12; F16D 28/00; F16D 2023/123; F16D 2041/0605;
(Continued)

(56) References Cited

U.S. PATENT DOCUMENTS 4,088,211 A * 5/1978 Doller ................. F16D 41/067
192/45.011
6,209,697 B1 * 4/2001 Austin ................. F16D 41/066
192/45.017
(Continued)

FOREIGN PATENT DOCUMENTS

DE 4219560 A1 10/1993
DE 10 2015 201 403 A1 7/2016
(Continued)

*Primary Examiner* — Mark A Manley
(74) *Attorney, Agent, or Firm* — Reid Baldwin

(57) ABSTRACT

A return stop selectively locks a rotatable inner ring to a stationary outer ring. A cage supports at least two roller pairs, each of which consists of two rollers, wherein a spring element spring-loads the two rollers against the outer ring. Each spring element is a double spring having two spring sections and a connecting section connecting the two spring sections to each other and to the cage. In response to rotation of the cage relative to the inner ring, one roller of each roller pair comes to bear against a ramp of the inner ring and the outer ring. The cage has a driver element at one end face which protrudes axially into the inner ring and can be connected to a contoured section on the inner ring in order to produce positive-locking attachment.

20 Claims, 3 Drawing Sheets

(51) Int. Cl.
*F16D 28/00* (2006.01)
*F16D 41/06* (2006.01)
*F16D 63/00* (2006.01)
*B60K 17/02* (2006.01)
*F16D 127/06* (2012.01)

(52) U.S. Cl.
CPC ...... *F16D 63/006* (2013.01); *F16D 2023/123* (2013.01); *F16D 2041/0605* (2013.01); *F16D 2127/06* (2013.01)

(58) Field of Classification Search
CPC .. F16D 41/088; F16D 63/006; F16D 2121/26; F16D 2127/06; F16D 2129/10; F16D 2250/0023
See application file for complete search history.

(56) References Cited

U.S. PATENT DOCUMENTS

| | | | | |
|---|---|---|---|---|
| 2005/0109567 | A1* | 5/2005 | Baumann | F16D 65/18 188/72.8 |
| 2007/0246319 | A1* | 10/2007 | Ploetz | F16D 41/067 192/45.1 |
| 2008/0217121 | A1* | 9/2008 | Cao | F16D 65/18 188/157 |
| 2013/0327609 | A1* | 12/2013 | Kawai | F16D 67/02 192/16 |
| 2017/0356506 | A1* | 12/2017 | Takada | B25J 19/0029 |

FOREIGN PATENT DOCUMENTS

| | | | |
|---|---|---|---|
| GB | 2245684 | * | 1/1992 |
| JP | WO2016080276 | * | 5/2016 |
| WO | 2017/038716 A1 | | 3/2017 |

* cited by examiner

RETURN STOP AND TRANSFER CASE COMPRISING A RETURN STOP

CROSS-REFERENCE TO RELATED APPLICATIONS

This application is the U.S. National Phase of PCT Appln. No. PCT/DE2018/100169 filed Feb. 26, 2018, which claims priority to DE102017107102 filed Apr. 3, 2017, the entire disclosures of which are incorporated by reference herein.

TECHNICAL FIELD

The disclosure relates to a return stop comprising a rotatable inner ring, a stationary outer ring, and a cage that is arranged radially between the inner ring and the outer ring and has a plurality of roller pairs. The disclosure furthermore relates to a transfer case for a motor vehicle, comprising a return stop of this kind.

BACKGROUND

Transfer cases which are fitted with a clutch device for setting a variable torque are known. Here, the level of the torque to be transmitted by the clutch device is dependent on a contact force of an actuator acting on the clutch device. The actuator may be driven by an electric motor via a worm gear in order to set the position of the clutch device and thus the level of the torque. The position set is then held by maintaining the power supply of the electric motor. The resulting power consumption is a disadvantage. Switching off the electric motor would entail a loss of the previously set position.

DE 10 2015 201 403 A1 discloses a return stop comprising a rotatable inner ring, a stationary outer ring, and a cage that is arranged radially between the inner ring and the outer ring and has a plurality of roller pairs, each of which consists of two rollers. At least one spring element is arranged between the two rollers of each roller pair in order to spring-load the rollers at least against the outer ring. A wedging ramp is formed on an outer circumferential surface of the inner ring for each roller of each roller pair. At least one cam, which is formed radially outwardly and engages in a groove formed in the cage, is arranged on the outer circumferential surface of the inner ring, wherein the at least one cam is designed to be smaller in the circumferential direction than the groove. The respective roller of each roller pair comes to bear both against the respective wedging ramp and against the outer ring by means of a movement of the cage relative to the inner ring. A radial depression is formed on the inner ring directly adjacent to each wedging ramp, wherein in each case only one roller of each roller pair comes to bear against the inner ring and the outer ring at the same time, and the respective other roller of each roller pair does not come to bear at least against the inner ring owing to the respective radial depression.

SUMMARY

A return stop comprises a rotatable inner ring, a stationary outer ring, and a cage that is arranged radially between the inner ring and the outer ring and has at least two roller pairs, each of which consists of two rollers, wherein a spring element is arranged spatially between the two rollers of each roller pair in order to spring-load the two rollers at least against the outer ring, wherein a wedging ramp is formed on an outer circumferential surface of the inner ring for each roller of each roller pair, wherein a radial depression is formed on the inner ring directly adjacent to each wedging ramp, and wherein in each case only one roller of each roller pair comes to bear against the inner ring and the outer ring at the same time, and the respective other roller of each roller pair does not come to bear at least against the inner ring owing to the respective radial depression, wherein furthermore the two respective wedging ramps of each roller pair are designed to lead away from each other in opposite directions in the circumferential direction, and wherein the cage has at least one driver element at one end face, wherein the at least one driver element protrudes axially into the inner ring and can be connected to a contoured section on the inner ring in order to produce positive-locking attachment, wherein the at least one driver element is designed to be smaller in the circumferential direction than the contoured section on the inner ring, and wherein one of the two rollers of each roller pair comes to bear both against the respective wedging ramp and against the outer ring by means of a movement of the cage relative to the inner ring.

To activate a locking function of the return lock it is first of all necessary to position each roller of each roller pair on the respective wedging ramp. By virtue of the fact that respective roller comes to bear against the respective wedging ramp and against the outer ring, the respective roller is ready to initiate locking of the inner ring if the direction of rotation of the inner ring is reversed. In particular, the return lock is of symmetrical construction, and therefore the above-described mode of operation applies to both directions of rotation of the return lock. The return lock is thus double acting. The positive-locking connection between the cage and the inner ring by means of the at least one driver element is particularly compact in design. In particular, each driver element is produced by punching out and forming. There remains a respective punched-out shape or a respective opening in the end face of the cage.

Each spring element is preferably designed as a double spring and supported on a respective web of the cage. Consequently, the spring element is designed as a single component. Each spring element preferably has two spring sections and a connecting section connecting the two spring sections to each other. The connecting section serves for mounting the spring element on the web. As a further preference, each connecting section has two hook elements for positive-locking connection of the respective spring element to the respective web. In particular, the two hook elements are formed by punching out and forming.

It is advantageous if the outer ring has knurling on an outer circumferential surface for positive-locking connection to a housing. Knurling should be taken to mean a toothed section which is formed on the outer ring, in particular encircling said ring. The outer ring is preferably pressed into a housing made of aluminum and connected positively thereto by means of the knurling.

The cage may have a longitudinal slot for the positive-locking reception of a double-flat shaft. The connection between the longitudinal slot and the double-flat shaft reduces, in particular, the contact pressure at the connection point and thereby improves torque transmission between the electric motor and the return stop. Furthermore, the longitudinal slot and the double-flat shaft form a particularly compact way of connecting a drive shaft and the return stop.

The cage preferably has a respective aperture in an outer circumferential surface for each roller of each roller pair, wherein the respective aperture is delimited in the circumferential direction, at least on one side, by a stop element formed radially inwardly for contact with the respective roller.

According to a preferred embodiment, at least the outer ring and the cage are made from a metallic sheet material. In particular, each spring element is also made from a sheet material.

The contoured section on the end face of the inner ring is advantageously provided for the purpose of receiving an assembly tool during assembly of the return stop. For this purpose, the assembly tool is passed through the openings in the end face of the cage. The cage is rotated relative to the inner ring in such a way that the rollers do not rest against the wedging ramps during the assembly of the return stop, in particular during the pressing-in process.

A transfer case for a motor vehicle, comprises a clutch unit for transmitting a variable torque, wherein the clutch unit can be controlled at least indirectly by an actuator to vary the torque. Furthermore, the actuator can be controlled at least indirectly by an electric motor, wherein the return stop described herein is arranged between the electric motor and the actuator.

BRIEF DESCRIPTION OF THE DRAWINGS

Further measures are illustrated in greater detail below, together with the description of a preferred illustrative embodiment, by means of the figures, wherein identical or similar elements are provided with the same reference signs. In the drawings.

DETAILED DESCRIPTION

Figure 1:
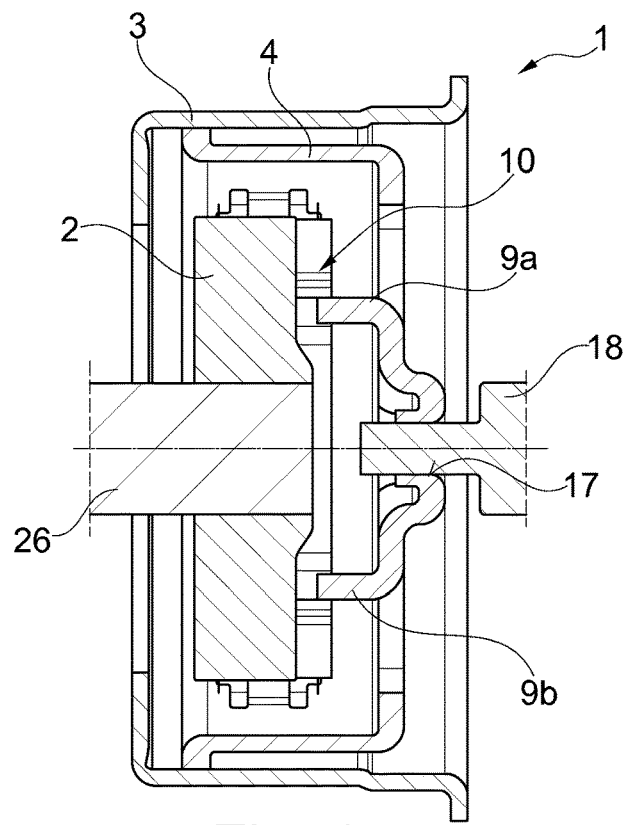
FIG. 1 shows a schematic section through a return stop.

Referring to FIG. 1, a return stop 1 comprises a rotatable inner ring 2, an outer ring 3 fixed so as to be stationary on a housing—not illustrated here—and a cage 4 that is arranged radially between the inner ring 2 and the outer ring 3. At one end face, the cage 4 has two driver elements 9a, 9b, which protrude axially into the inner ring 2 and can be connected to a contoured section 10 on the inner ring 2 in order to produce positive-locking attachment. Each driver element 9a, 9b is designed to be smaller in the circumferential direction than the contoured section 10 on the inner ring 2. At one end face, the cage 4 has a longitudinal slot 17 for the positive-locking reception of a double-flat shaft 18. The double-flat shaft 18 is designed as a rotor shaft of an electric motor. An output shaft 26 is furthermore connected for conjoint rotation to the inner ring 2.

Figure 2:
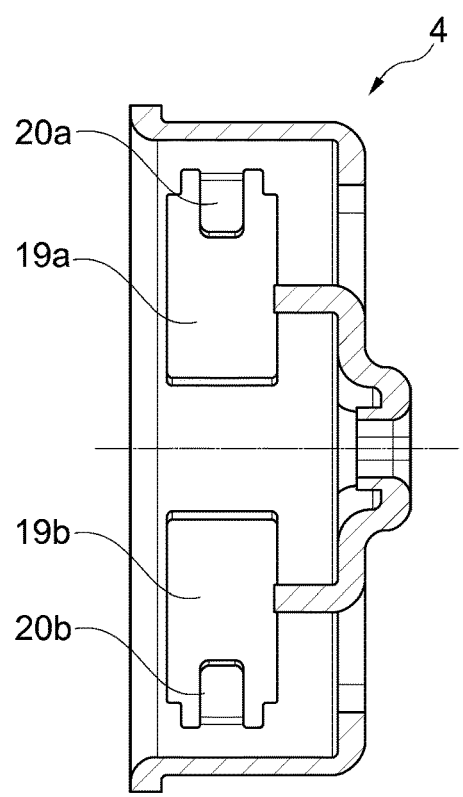
FIG. 2 shows a schematic section through a cage of the return stop shown in FIG. 1.

The cage 4 of the return stop 1 shown in FIG. 1 is illustrated in FIG. 2. The cage 4 has a respective aperture 19a, 19b in an outer circumferential surface for each of the rollers 6a, 6b, shown in FIG. 3, of a respective roller pair 5a, 5b. The respective aperture 19a, 19b is delimited in the circumferential direction on one side by a stop element 20a, 20b formed radially inwardly, against which the respective roller 6a, 6b can come to bear.

Figure 3:
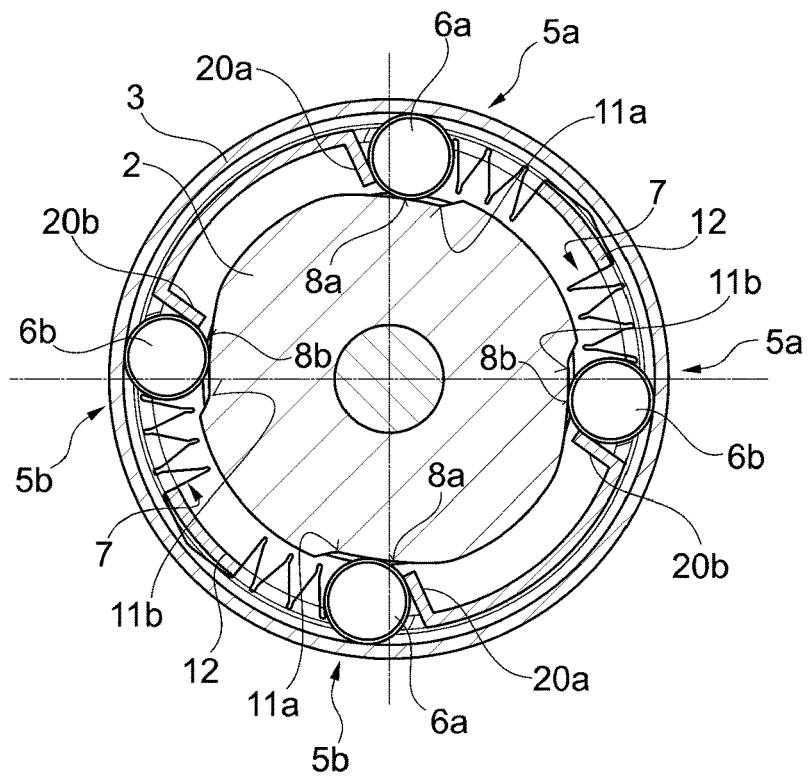
FIG. 3 shows another schematic section through the return stop shown in FIG. 1.

According to FIG. 3, the return stop 1 has two roller pairs 5a, 5b, each having two rollers 6a, 6b, wherein a spring element 7 is arranged spatially between the two rollers 6a, 6b of each roller pair 5a, 5b in order to spring-load the two rollers 6a, 6b at least against the outer ring 3. Each spring element 7 is designed as a double spring and is supported on a respective web 12 of the cage 4. A wedging ramp 8a, 8b is formed on an outer circumferential surface of the inner ring 2 for each roller 6a, 6b of each roller pair 5a, 5b, wherein a radial depression 11a, 11b is formed on the inner ring 2 directly adjacent to each wedging ramp 8a, 8b. FIG. 3 shows a central position of the return stop 1. In this position, the roller pairs 5a, 5b do not come to bear against the inner ring 2, nor do the driver elements 9a, 9b shown in FIG. 1 come to bear against the cage 4.

When the cage 4 rotates counterclockwise, the respective rollers 6a of each roller pair 5a, 5b come to bear against the respective clamping ramp 8a and are ready to initiate a locking function if there is an unwanted reversal of the direction of rotation. The respective rollers 6b are held by the cage 4 in such a way that they are reliably prevented from coming to bear against the respective wedging ramp 8b. Moreover, the respective radial aperture 11b also contributes to this. As soon as the driver elements 9a, 9b come to bear against the cage 4 on the contoured section 10 on the inner ring 2, the cage 4 is connected to the inner ring 2 for conjoint rotation therewith in the clockwise direction and enables the inner ring 2 to be taken along. Idling is achieved by means of the respective rollers 6a. An unwanted reversal of the direction of rotation of the inner ring 2 would result in locking of the return stop by means of the respective rollers 6a.

Consequently, just one roller 6a, 6b of each roller pair 5a, 5b comes to bear simultaneously against the inner ring 2 and against the outer ring 3 in each case, depending on the direction of rotation. The respective other roller 6b, 6a of each roller pair 5a, 5b does not come to bear at least against the inner ring 2 owing to the respective radial aperture 11b, 11a. Both of the respective wedging ramps 8a, 8b of each roller pair 5a, 5b are designed to lead away from each other in opposite directions in the circumferential direction.

Figure 4:
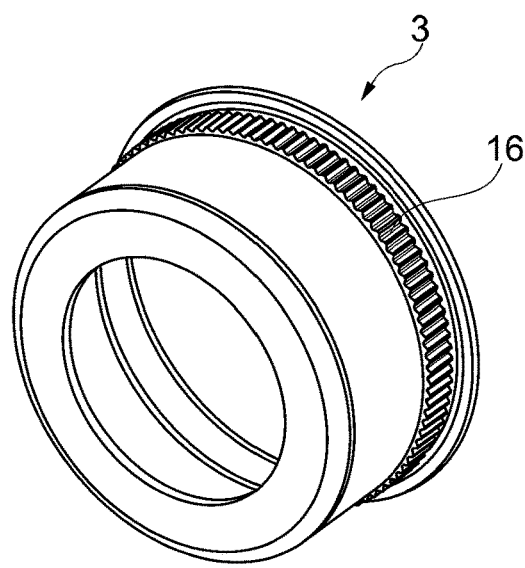
FIG. 4 shows a schematic perspective illustration of an outer ring of the return stop shown in FIG. 1.

The outer ring 3 shown in FIG. 1 is illustrated in perspective in FIG. 4. The outer ring 3 is made from a metallic sheet material and has encircling knurling 16 on an outer circumferential surface for positive-locking connection to the housing—not illustrated here.

Figure 5:
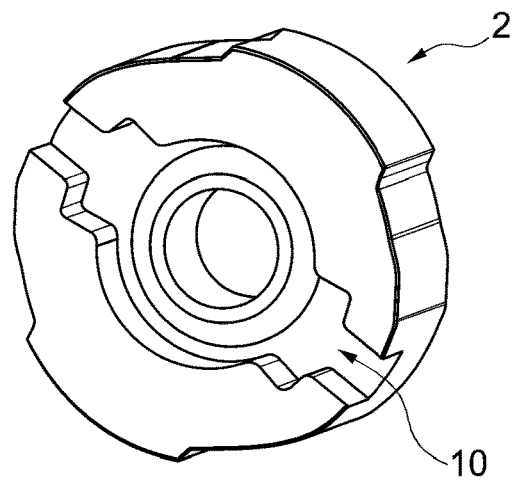
FIG. 5 shows a schematic perspective illustration of an inner ring of the return stop shown in FIG. 1.

FIG. 5 shows, in a perspective illustration, the inner ring 2 shown in FIG. 1. The contoured section 10 on the end face of the inner ring 2 is particularly clearly evident from FIG. 5, being provided to receive the two driver elements 9a, 9b when the cage 4 is rotated in order to drag the inner ring along. Moreover, the contoured section 10 also serves to receive an assembly tool during assembly of the return stop 1.

Figure 6:
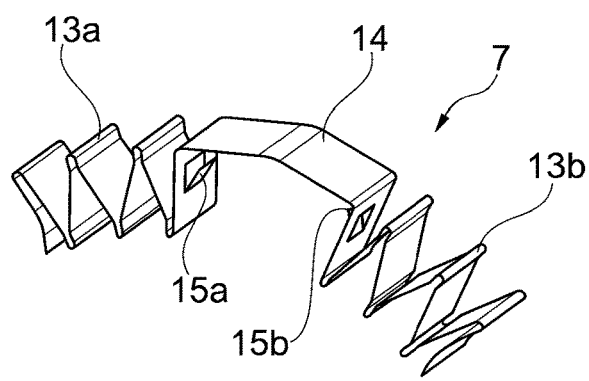
FIG. 6 shows a schematic perspective illustration of a spring element of the return stop shown in FIG. 1.

FIG. 6 shows the spring element 7 from FIG. 3. The spring element 7 has two spring sections 13a, 13b and a connecting section 14 connecting the two spring sections 13a, 13b to each other. The spring sections 13a, 13b are of meandering design and are provided for the purpose of subjecting the rollers 6a, 6b to a spring force in the circumferential direction. Moreover, two hook elements 15a, 15b for positive-locking connection of the spring element 7 to the web 12 are formed on the connecting section 14. Consequently, the spring element 7 can be clipped or fastened radially to the web 12.

Figure 7:
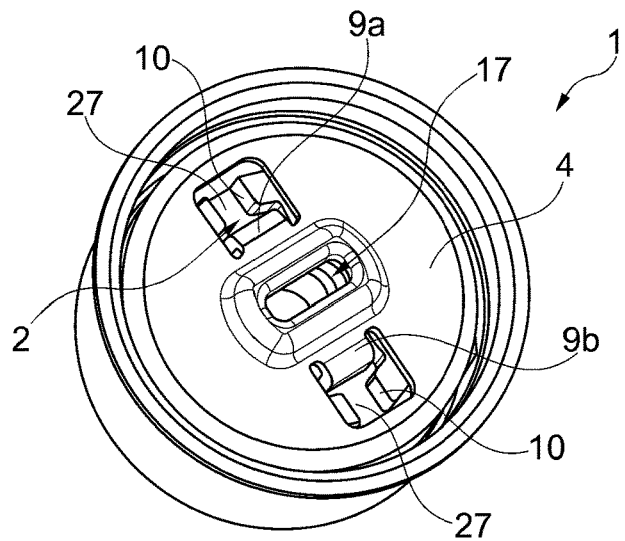
FIG. 7 shows a schematic perspective illustration of the return stop shown in FIG. 1.

The return stop 1 is illustrated in perspective in FIG. 7. The cage 4 has the longitudinal slot 17 for the positive-locking reception of a double-flat shaft 18. Moreover, a punched-out shape, in particular an opening 27, through which an assembly tool can be passed during assembly of the return stop 1 in order to come to bear against the contoured section 10 on the end face of the inner ring 2 and thereby align or rotate the cage 4 relative to the inner ring 2 is formed on the end face of the cage 4 by virtue of the formation of the respective driver element 9a, 9b.

Figure 8:
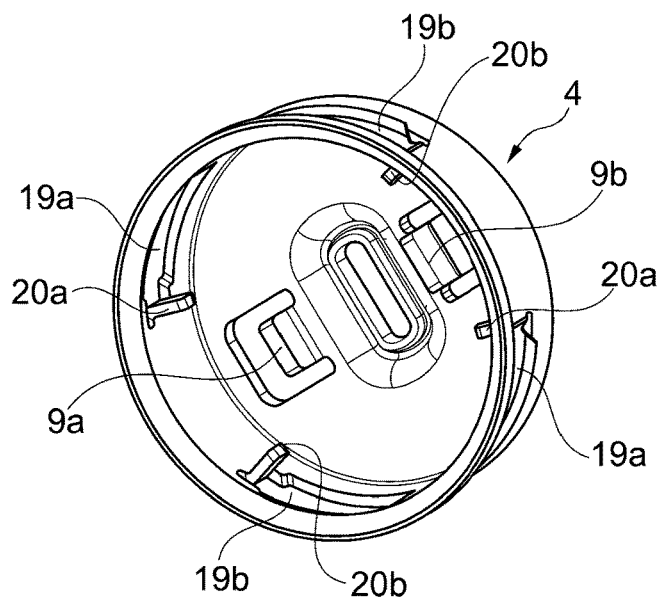
FIG. 8 shows a schematic perspective illustration of the cage shown in FIG. 2.

FIG. 8 shows a perspective illustration of the cage 4. The apertures 19a, 19b in the outer circumferential surface of the cage 4, which are provided for each roller 6a, 6b of each roller pair 5a, 5b, are particularly clearly evident from FIG. 8. The respective aperture 19a, 19b is delimited on one side in the circumferential direction by the respective stop element 20a, 20b. The cage 4 is made from a metallic sheet material. The two driver elements 9a, 9b are formed by punching out and forming.

Figure 9:
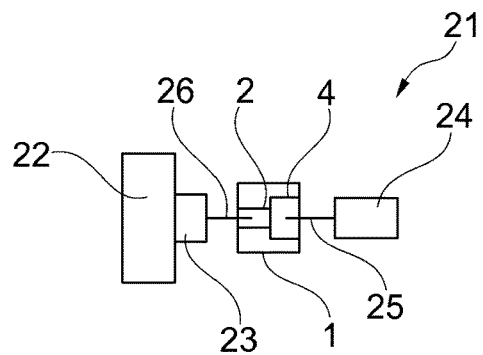
FIG. 9 shows a simplified schematic section through a transfer case having the return stop shown in FIG. 1.

FIG. 9 shows a transfer case 21 of a motor vehicle—not illustrated here—having a clutch unit 22, actuator 23, an electric motor 24 and the return stop 1 described above. The electric motor 24 drives the cage 4 of the return stop 1 via a drive shaft 25. The cage 4 transmits the rotary motion to the inner ring 2 as described above, and the inner ring, in turn, is connected to an output shaft 26. The actuator 23 controlling the clutch unit 22 is connected to the return stop 1 via the output shaft 26.

LIST OF REFERENCE SIGNS 1 return stop
2 inner ring
3 outer ring
4 cage
5a, 5b roller pair
6a, 6b roller
7 spring element
8a, 8b wedging ramp
9a, 9b driver element
10 contoured section
11a, 11b radial depression
12 web
13a, 13b spring section
14 connecting section
15a, 15b hook element
16 knurling
17 longitudinal slot
18 double-flat shaft
19a, 19b aperture
20a, 20b stop element
21 transfer case
22 clutch unit
23 actuator
24 electric motor
25 drive shaft
26 output shaft
27 opening

The invention claimed is:

1. A return stop comprising a rotatable inner ring, a stationary outer ring, and a cage that is arranged radially between the inner and the outer ring and has at least two roller pairs, each of which consists of two rollers, wherein a spring element is arranged spatially between the two rollers of each roller pair in order to spring-load the two rollers at least against the outer ring, wherein a wedging ramp is formed on an outer circumferential surface of the inner ring for each roller of each roller pair, wherein a radial depression is formed on the inner ring directly adjacent to each wedging ramp, and wherein in each case only one roller of each roller pair comes to bear against the inner ring and the outer ring at a same time, and the respective other roller of each roller pair being spaced away from the inner ring at the same time due to the respective radial depression, wherein furthermore the two respective wedging ramps of each roller pair are designed to lead away from each other toward the respective depressions in the circumferential direction, wherein the cage has at least one driver element at one end face, wherein the at least one driver element protrudes axially into the inner ring and can be connected to a contoured section on the inner ring in order to produce positive-locking attachment, wherein the at least one driver element is designed to be smaller in the circumferential direction than the contoured section on the inner ring, wherein one of the two rollers of each roller pair comes to bear both against the respective wedging ramp and against the outer ring by means of a movement of the cage relative to the inner ring.

2. The return stop of claim 1,
wherein each spring element is designed as a double spring and is supported on a respective web of the cage.

3. The return stop of claim 1 wherein each spring element has two spring sections and a connecting section connecting the two spring sections to each other.

4. The return stop of claim 3,
wherein each connecting section has two hook elements for positive-locking connection of the respective spring element to the respective web.

5. The return stop of claim 1 wherein the outer ring has knurling on an outer circumferential surface for positive-locking connection to a housing.

6. The return stop of claim 1 wherein the cage has a longitudinal slot for the positive-locking reception of a double-flat shaft.

7. The return stop of claim 1 wherein the cage has a respective aperture in an outer circumferential surface for each roller of each roller pair, wherein the respective aperture is delimited in the circumferential direction, at least on one side, by a stop element formed radially inwardly for contact with the respective roller.

8. The return stop of claim 1 wherein at least the outer ring and the cage are made from a metallic sheet material.

9. The return stop of claim 1 wherein the contoured section on the end face of the inner ring is provided for the purpose of receiving an assembly tool during assembly of the return stop.

10. A transfer case for a motor vehicle, comprising a clutch unit for transmitting a variable torque, wherein the clutch unit can be controlled at least indirectly by an actuator to vary the torque, wherein furthermore the actuator can be controlled at least indirectly by an electric motor, and wherein a return stop as per claim 1 is arranged between the electric motor and the actuator.

11. A return stop comprising:
a stationary outer ring;
a cage having at least one driver element at one end face;
two roller pairs, each of which consists of two rollers,
wherein a spring element is arranged spatially between the two rollers of each roller pair in order to spring-load the two rollers against the outer ring, wherein each spring element has two spring sections and a connecting section connecting the two spring sections to each other; and a rotatable inner ring wherein a wedging ramp is formed on an outer circumferential surface of the inner ring for each roller of each roller pair, wherein a radial depression is formed on the inner ring directly adjacent to each wedging ramp, wherein the two respective wedging ramps of each roller pair are designed to lead away from each other toward the respective depressions in the circumferential direction, wherein the at least one driver element protrudes axially into the inner ring and can be connected to a contoured section on the inner ring in order to produce positive-locking attachment, wherein one of the two rollers of each roller pair comes to bear both against the respective wedging ramp and against the outer ring in response to a movement of the cage relative to the inner ring.

12. The return stop of claim 11, wherein each connecting section has two hook elements for positive-locking connection of the respective spring element to a respective cage web.

13. The return stop of claim 11 wherein the outer ring has knurling on an outer circumferential surface for positive-locking connection to a housing.

14. The return stop of claim 11 wherein the cage has a respective aperture in an outer circumferential surface for each roller of each roller pair, wherein the respective aperture is delimited in the circumferential direction, at least on one side, by a stop element formed radially inwardly for contact with the respective roller.

15. The return stop of claim 11 wherein at least the outer ring and the cage are made from a metallic sheet material.

16. A return stop comprising:
a stationary outer ring;
a cage having at least one driver element at one end face, and wherein the cage has a longitudinal slot for the positive-locking reception of a double-flat shaft;
two roller pairs, each of which consists of two rollers, wherein a spring element is arranged spatially between the two rollers of each roller pair in order to spring-load the two rollers against the outer ring; and a rotatable inner ring wherein a wedging ramp is formed on an outer circumferential surface of the inner ring for each roller of each roller pair, wherein a radial depression is formed on the inner ring directly adjacent to each wedging ramp, wherein the two respective wedging ramps of each roller pair are designed to lead away from each other toward the respective depression in the circumferential direction, wherein the at least one driver element protrudes axially into the inner ring and can be connected to a contoured section on the inner ring in order to produce positive-locking attachment, wherein one of the two rollers of each roller pair comes to bear both against the respective wedging ramp and against the outer ring in response to a movement of the cage relative to the inner ring.

17. The return stop of claim 16 wherein each spring element has two spring sections and a connecting section connecting the two spring sections to each other.

18. The return stop of claim 17, wherein each connecting section has two hook elements for positive-locking connection of the respective spring element to a respective cage web.

19. The return stop of claim 16 wherein the cage has a respective aperture in an outer circumferential surface for each roller of each roller pair, wherein the respective aperture is delimited in the circumferential direction, at least on one side, by a stop element formed radially inwardly for contact with the respective roller.

20. The return stop of claim 16 wherein at least the outer ring and the cage are made from a metallic sheet material.

* * * * *